United States Patent [19]

Chambers et al.

[11] 4,375,845
[45] Mar. 8, 1983

[54] TAIL SECTION FOR MULTIPLE CHAIN DRAG CONVEYOR

[75] Inventors: Al L. Chambers, St. Charles, Mo.; Carl V. Parker, West Memphis, Ark.

[73] Assignee: Bunge Corporation, New York, N.Y.

[21] Appl. No.: 208,880

[22] Filed: Nov. 21, 1980

[51] Int. Cl.³ .......................................... B65G 23/44
[52] U.S. Cl. ................... 198/570; 198/725; 198/816
[58] Field of Search ............... 198/570, 571, 718, 725, 198/726, 728, 735, 856, 813–816

[56] References Cited

U.S. PATENT DOCUMENTS

| | | | |
|---|---|---|---|
| Re. 7,898 | 10/1877 | Gustin | 198/726 |
| 1,055,591 | 3/1913 | Afzelius . | |
| 2,759,594 | 8/1956 | Kleboe et al. | 198/814 |
| 2,760,621 | 8/1956 | Crescenzo | 198/735 |
| 2,828,853 | 4/1958 | Hart | 198/735 X |
| 3,283,882 | 11/1966 | Conrad . | |
| 3,845,375 | 10/1974 | Stiebel | 198/856 X |

FOREIGN PATENT DOCUMENTS 565477 7/1960 Belgium .
656301 8/1951 United Kingdom .

OTHER PUBLICATIONS

Brochure—Tramco Metal Products, Inc.—Model N Tramco Conveyor.

Primary Examiner—Jeffrey V. Nase
Attorney, Agent, or Firm—Jarblum & Solomon

[57] ABSTRACT

A tail assembly for a multiple chain drag conveyor, including a take-up assembly and multiple tail shafts rotatably mounted on the take-up assembly, each of which carries a chain engaging sprocket. Adjustment devices are connected to the tail shafts. The shafts are capable of travel in a direction parallel to the direction of travel of the chain engaged by the associated sprocket and are caused to travel in that direction by the adjustment devices to permit individual tensioning and adjustment of each of the chains.

6 Claims, 4 Drawing Figures

TAIL SECTION FOR MULTIPLE CHAIN DRAG CONVEYOR

BACKGROUND OF THE INVENTION

The invention relates to a tail section for a multiple chain drag conveyor system utilized to transport and move feed, grain, cereals or other material over extended distances.

An important aspect of the conveying of large quantities of granular material is the ability to move that material over extended distances from an off-loading area to a storage area in an automated manner. In order to accomplish this, several types of conveyors have been designed and are presently being employed. One such type is a box conveyor which has a succession of boxes affixed to an endless chain. As the boxes pass under a loading platform, they are filled with grain or similar material, the timing being such that each box is under the loading spout for a predetermined period of time sufficient to fill it as it passes. The boxes are conveyed along to the storage area where they empty their contents into the storage bin.

Another form of conveyor is a chain drag conveyor such as the ones built by Tramco Metal Products, Inc. of Wichita, Kans. under the trade name "TRAMCO CHAIN CONVEYORS." The larger capacity chain drag conveyors require that two or more chains be employed. Each chain is carried on a sprocket in a tail section of the conveyor. The chain extends all the way to a head section of the conveyor which is situated in the storage area. A number of paddles or a flight are secured to the chains and serve to push the grain or similar material along the conveyor path from the loading area to the storage area. The sprockets are mounted in the tail section on a single shaft. The use of a single shaft tail section for a multiple chain drag conveyor raises several problems. For instance, if a chain break occurs, the shaft and associated sprockets will continue to turn because of the inability to sense breakage of a single chain. As a result, the head section of the conveyor can be severely damaged, and the second chain, which did not break, may also suffer injury.

Another problem is that whenever one portion of a chain must be replaced, it is difficult to adjust and tension the two chains relative to one another, because as a chain is used, it tends to stretch slightly. Therefore, replacing a section of a chain or an entire chain will result in a disparate length between the two chains. Because adjustments are essentially in one plane, any tension on one side of the shaft in order to tighten or loosen that chain will result in the shaft being displaced from the perpendicular to the direction of motion of the chains. Thus, by having both carry sprockets on a common tail shaft take-up system, the replacement of only one chain or a portion of a chain creates a number of problems. However, cost and other factors make it undesirable to replace both chains if there is damage to only one.

Another problem is that by carrying both sprockets on a single shaft, any jam or delay on one flight of the conveyor may result in damage to the sprocket and chain carrying the other flight, as well as damage to the head section which powers the multiple drag chain configuration. If the damage is sufficiently severe, the objective of conveying large quantities of granular material from an off-loading area to a storage area is defeated.

An additional problem is that use of a single shaft for a multiple chain drag conveyor may cause injury to other parts of the conveyor assembly, particularly over extended lengths. The inability properly to tension and adjust the chains causes additional wear and tear and accordingly limits the dependability of the conveyor system and shortens its useful life.

A further and particularly significant problem resulting from the use of a single tail shaft to carry multiple chains and sprockets arises because of the nature of the automation. In particular, if one chain becomes damaged or breaks, the entire conveyor assembly frequently must be cleared and, because both chains are on a single shaft it becomes difficult to remove the damaged chain. This is particularly true if the grain loading mechanism continues to pour grain into the tail section, expecting that it will be carried off. It is not only costly and time consuming, but dangerous to have a build-up of grain at one end of the conveyor with concomitant increase in dust, a highly flammable and serious situation, not to mention the loss of grain resulting from the spillage.

OBJECTS AND SUMMARY OF THE INVENTION

It is a broad object of the invention to provide an apparatus which overcomes the above-described difficulties and problems and does so at substantially reduced cost.

It is a further object of the present invention to provide a tail section for a multiple chain drag conveyor which will permit replacement and adjustment of a single chain.

It is another object of this invention to provide a tail section for a multiple chain drag conveyor which permits the sensing of a break in a single chain automatically to shut down the conveyor and thereby prevent damage to the head section of the conveyor and the other chain or chains.

One general object of the invention is to provide a tail section for a multiple chain drag conveyor which will permit ease of maintenance and eliminate the problems encountered in employing a single tail shaft to carry multiple sprockets and chains.

It is still a further object of the invention to provide a tail section for a multiple chain drag conveyor which permits proper and rapid adjustment of each chain to minimize wear and tear on the conveyor system and eliminates the likelihood of damage and abnormal frictional engagement between the chain or the flight and the conveyor as the result of improper adjustment or tensioning.

Yet another object of the invention is to provide a tail section for a multiple chain drag conveyor which permits ease of adjustment of either chain and permits automatic shut-off of associated feed assemblies if one of the chains or the flight of paddles carried by one of the chains is in any way stalled or damaged.

In one illustrative embodiment of the invention, each sprocket for carrying chain is carried on an individual shaft. Each shaft is movably secured to a take-up frame which permits the shaft and the associated sprocket to be moved in a direction parallel to the direction of travel of the chain and flight. In accordance with certain preferred embodiments, the tail section for a multiple chain drag conveyor has an adjustment assembly associated with each end of the shaft to permit the entire shaft to be moved in a direction parallel to the direction of motion of the chain. This enables both a reduction in tension on the chain to permit the chain to be removed and an increase in tension on the chain in order to take up any slack occasioned by the replacement on an old chain by new sections of chain.

In accordance with yet another feature of an embodiment of the invention, a no-motion switch senses the rotational motion of each tail shaft. If a chain breaks, the no-motion switch will automatically stop the other chains, as well as all related machinery, in order to prevent damage to the head section of the conveyor and to the other chains.

In still a further preferred embodiment, the tail shafts may be offset in the take-up frame in order to permit the tail shafts to be of a uniform length and hence, interchangeable, while still providing the necessary adjustment capability.

In another preferred embodiment, the resulting multiple tail shaft tail section permits the use of chains which are not necessarily of the same length. Accordingly, the requirement of many prior systems that chains be of virtually identical lengths is eliminated, and the take-up assembly has sufficient latitude to permit the proper tensioning and adjustment of each chain.

In this specification and the accompanying drawings, applicants have shown and described several preferred embodiments of their invention and have suggested various alternatives and modifications thereto, but it is to be understood that these are not intended to be exhaustive and that many changes and modifications can be made within the scope of the invention. These suggestions herein are selected and included for purposes of illustration only, in order that others skilled in the art will more fully understand the invention and principles thereof, and will thus be enabled to modify it and embody it in a variety of forms, each as may be best suited to the conditions of a particular use.

DESCRIPTION OF CERTAIN PREFERRED EMBODIMENTS

Figure 1:
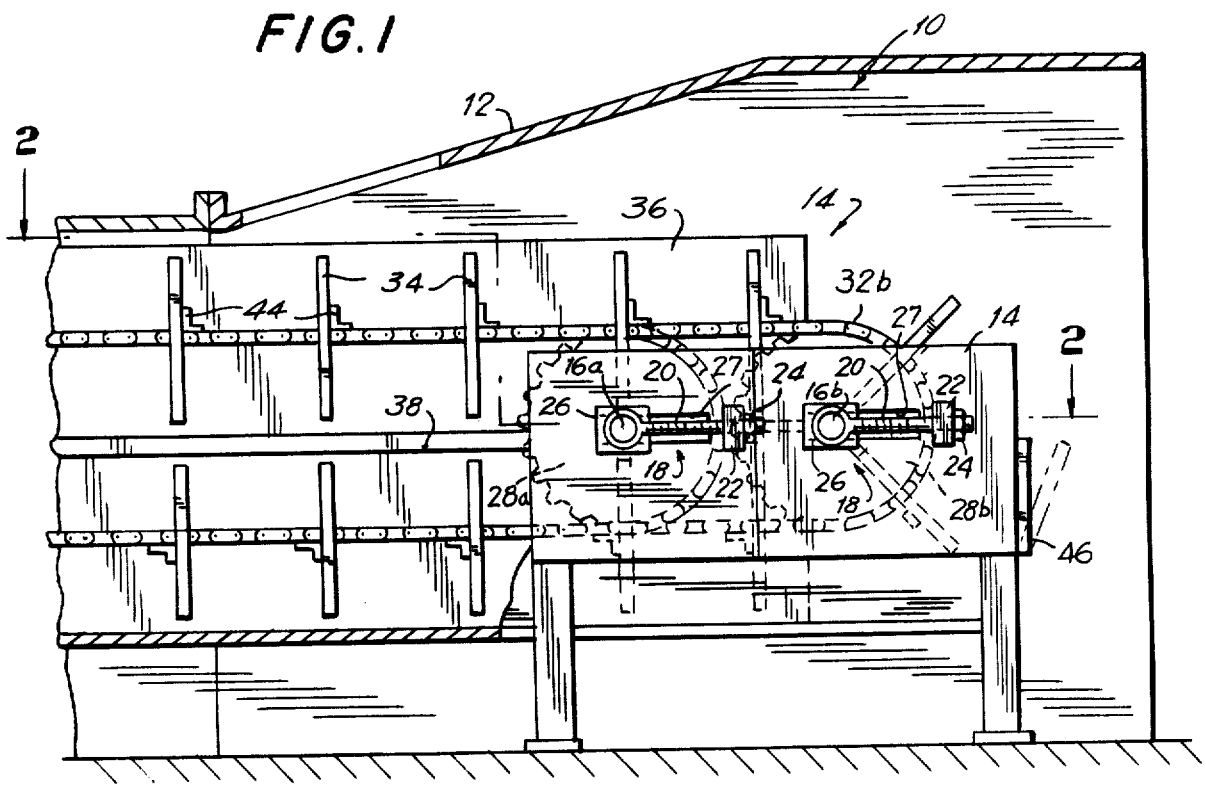
FIG. 1 is a side-elevational view of a tail section of a multiple chain drag conveyor provided with multiple shafts, with certain portions shown in section.

Referring to FIG. 1, a chain drag conveyor 10 is shown with a tail section 12 having a take-up frame assembly 14 located therein. The take-up frame assembly 14 includes a first tail shaft 16a and a second tail shaft 16b, slidably mounted on the take-up frame assembly 14. An adjustment assembly 18 is secured to each end of the first tail shaft 16a and the second tail shaft 16b. The adjustment assemblies 18 may be of a variety of configurations. As is best exemplified in FIG. 2, the adjustment assembly 18 associated with the end of each tail shaft 16a, 16b is comprised of an eye bolt 20 through which the end of the tail shaft protrudes. The tail shaft 16a, 16b rotates within the eye of the eye bolt 20. An adjustment mount 22 is welded or otherwise affixed to the take-up frame assembly 14, and the threaded portion of the eye bolt 20 extends through the adjustment mount. An adjustment nut 24 is placed on the threaded portion of the eye bolt 20. A mounting plate 26 is slidably situated in a horizontal take-up aperture 27 of the take-up frame assembly 14. The mounting plate 26 rides within the horizontal take-up aperture 27. The tail shaft 16a, 16b extends through the mounting plate 26 and is able to rotate therein.

Figure 3:
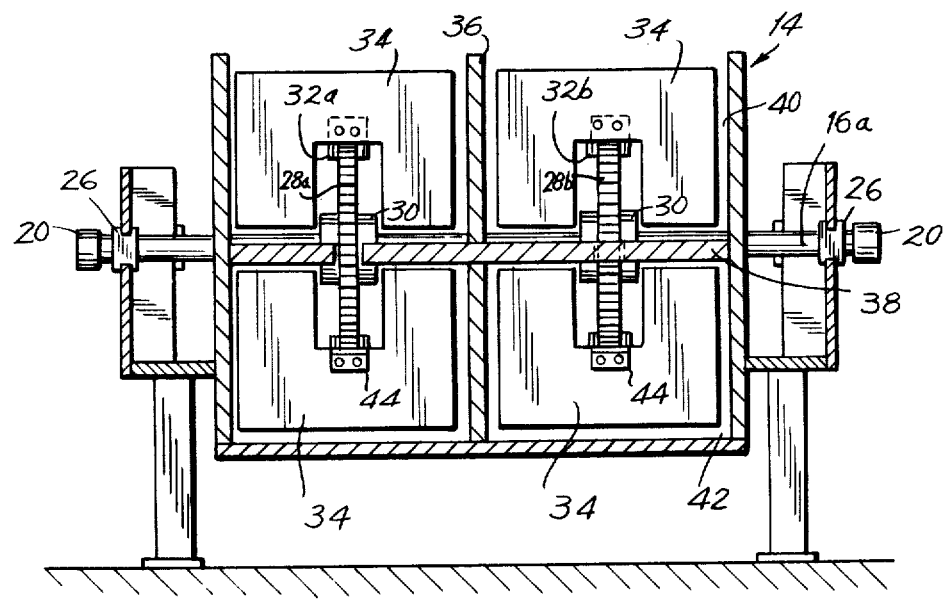
FIG. 3 is an end-view of the tail section taken on line 3—3 of FIG. 2.

The first tail shaft 16a and the second tail shaft 16b have a first sprocket 28a and a second sprocket 28b respectively secured thereto via a mounting collar 30. Referring to FIGS. 1 and 3, the first sprocket 28a and the second sprocket 28b are parallel to one another and rigidly secured to the respective collars 30. The collars 30 are rigidly mounted upon the respective first tail shaft 16a and the second tail shaft 16b.

A first drag chain 32a and a second drag chain 32b are carried upon the first sprocket 28a and the second sprocket 28b, respectively, and extend from the tail section sprockets to a head section (not shown). The first chain 32a and the second chain 32b each carry a flight of paddles 34. The paddles 34 are rigidly mounted on the respective chains such that they are perpendicular to the direction of motion of the two chains 32a, 32b. The flights of paddles 34 serve to push the grain from the tail section 12 to the head section which is in the vicinity of the storage area.

Referring to FIG. 3, a vertical divider 36 extends along the entire length of the chain drag conveyor to separate the flights of paddles 34 carried on each of the two chains 32a, 32b. A horizontal separator 38 separates an upper conveyor track 40 and a lower conveyor track 42. Each paddle is rigidly secured to the chain via an L-shaped mounting plate 44. The L-shaped mounting plate 44 maintains the position of the individual paddles 34 relative to one another and maintains the flight of paddles in a position perpendicular to the direction of motion of each of the chains 32a, 32b. A clean-out door 46 may be provided at the take-up frame 14 to permit removal of any excess grain or foreign matter which may accumulate in the tail section 12.

Figure 2:
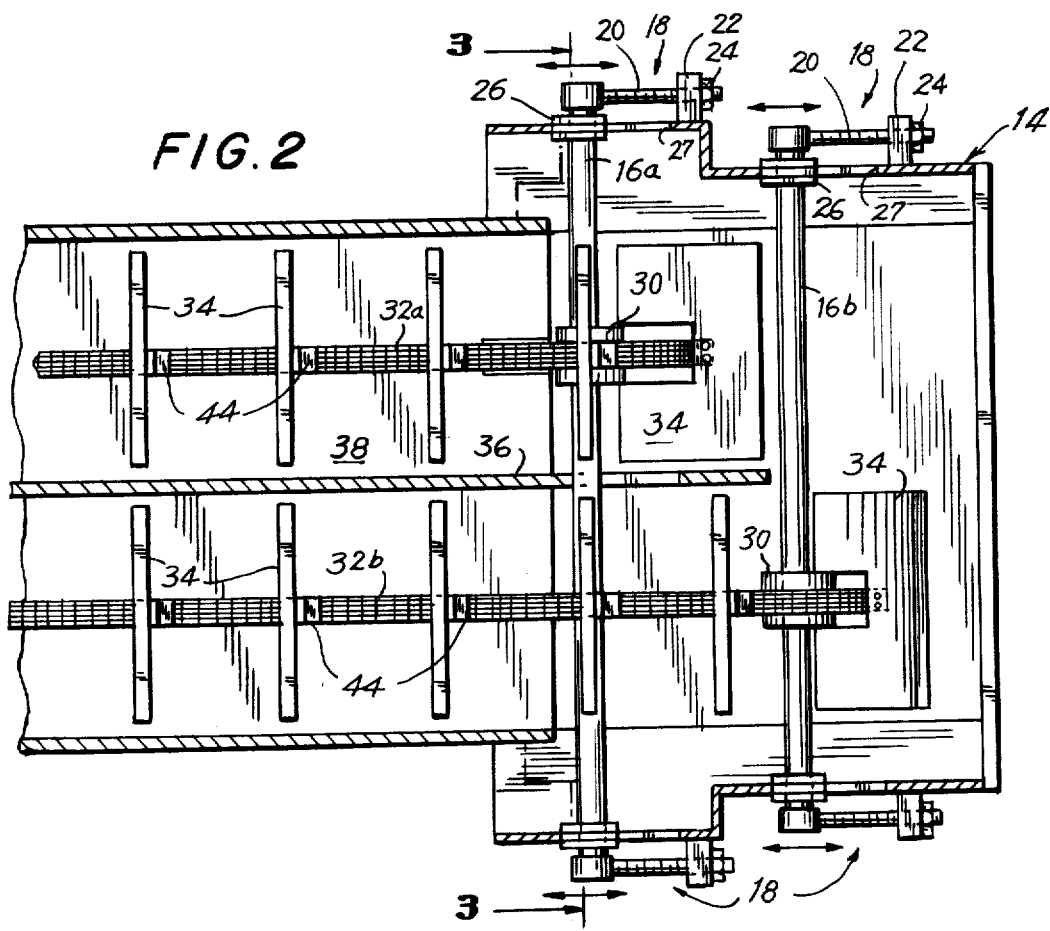
FIG. 2 is a top cross-sectional view of a tail section of the multiple chain drag conveyor taken on line 2—2 of FIG. 1.
Figure 4:
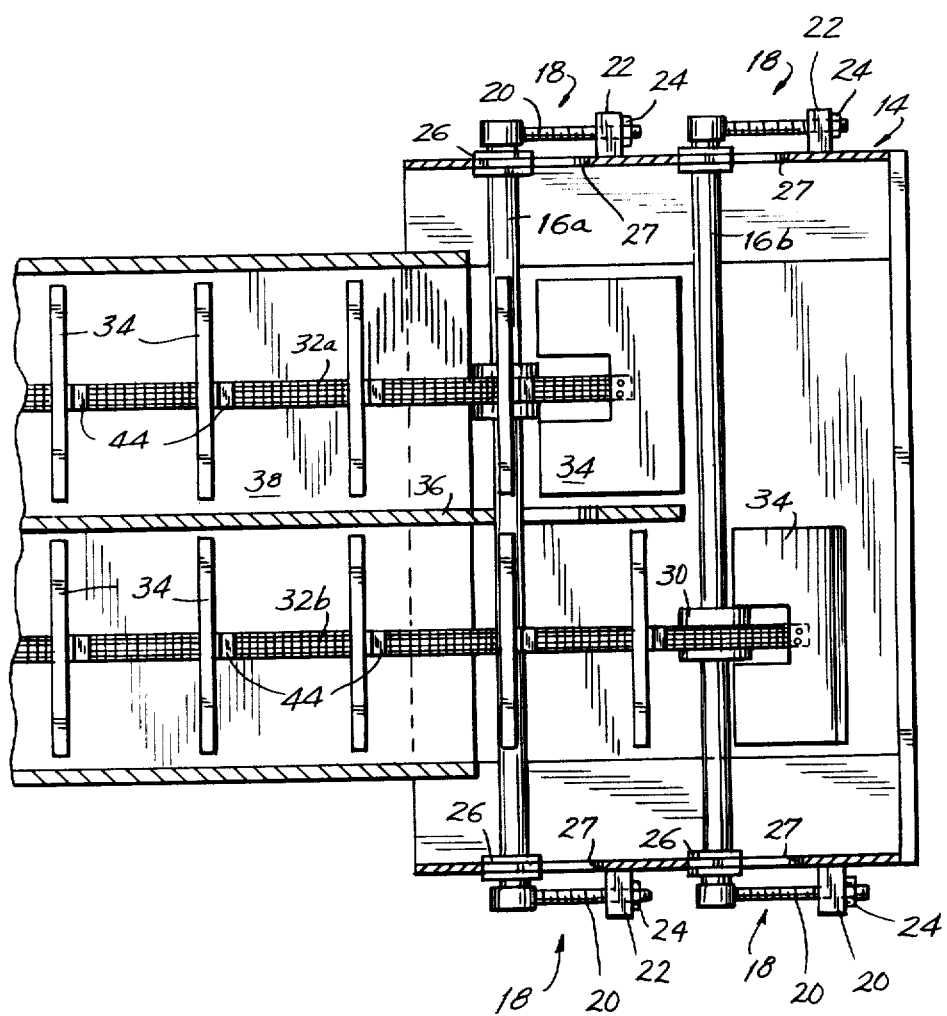
FIG. 4 is a top plan-view of a portion of a tail section of a multiple chain drag conveyor having multiple tail shafts, with certain portions taken in section, showing a modified offset shaft configuration in which the tail shafts are of the same length, in accordance with another preferred embodiment of the invention.

The first tail shaft 16a and the second tail shaft 16b may be of different lengths, as is illustrated in FIG. 2. However, referring to FIG. 4, there is shown, according to another embodiment of the invention, a tail section 12 in which the first tail shaft 16a and the second tail shaft 16b are of the same length. This has the additional advantage of minimizing the number of replacement shafts which must be kept in inventory. The adjustment assemblies 18 are offset so that the shafts and related assemblies are interchangeable with one another.

In operation, a no-motion switch (not shown) may be associated with each tail shaft in a manner which is readily known to those skilled in the art. If, by way of example, the first drag chain 32a breaks, the no-motion switch associated with the first tail shaft 16a will sense that the shaft has stopped rotating. By the use of appropriate electrical circuitry, the switch will shut down the drag chain conveyor 10 and close off the associated grain feed assemblies (not shown). The section of chain 32a which has broken can be replaced, and any paddles 34 or mounting plates 44 which are on the damaged section of chain can be taken off the old section and put on to the new section.

Thereafter, the adjustment nut 24 on the adjustment assembly 20 associated with each end of the first tail shaft 16a is loosened to cause the first sprocket 28a to move in the direction of the head section. The first chain 32a is looped over the first sprocket 28a, and the adjustment nut 24 is tightened, thereby urging the sprocket carried on the tail section away from the head section and accordingly, tightening the chain carried thereby. The adjustment nut 24 on either side of the tail shaft permits the two ends of the shaft to be taken up separately, such that the first sprocket 28a is maintained parallel to the sprocket being carried on the second tail shaft 16b and on a plane parallel to the direction of travel of the chain being carried thereon.

In use, the ability to tension each end of each tail shaft provides a system for tensioning individually each chain. Because the apparatus permits the individual tensioning of chains, the chains may be of different sizes and lengths. Furthermore, the apparatus results in a substantial monetary saving because it permits the replacement of sections of chains, rather than requiring entire chains and their associated flights of paddles to be replaced. Even more important, the system safeguards the head section by shutting down the chain drag conveyor if there is a break in one of the chains and, at the same time, prevents damage to the other chains being employed by the multiple chain drag conveyor. By use of the multiple tail shafts to permit precise adjustment and tensioning, unnecessary wear and tear caused by misaligned sprockets is eliminated, thereby adding to the useful life of the chain drag conveyor system.

The terms and expressions which have been employed herein are terms of description and not of limitation, and there is no intention in the use of such terms and expressions to exclude any equivalents of the features shown and described or portions thereof. It will be appreciated that the foregoing exemplary embodiments may be substantially varied within the scope of the invention. The size of the sprockets and tail shafts may be enlarged or reduced. The tail shafts and associated chains may be increased, depending upon the amount of material to be carried and the size of the chain drag conveyor itself. Wheels may be substituted for the sprockets, and the chains may be made of a variety of materials capable of carrying a flight of paddles. Moreover, the invention in its broadest aspects may be employed in the handling of numerous types of granular material, including metals, minerals, foodstuff, and the like, where the material is in somewhat granular form. It is recognized that various modifications are possible within the scope of the invention claimed.

What is claimed is:

1. A tail assembly for a multiple chain drag conveyor having at least two independent conveyor chains each carrying an independent flight of paddles and capable of independent, continuous movement on an endless path comprising:
   (a) a take-up frame assembly mounted within said tail assembly;
   (b) a plurality of tail shaft mechanisms mounted in common within said tail assembly which each include a tail shaft having two ends carried on the take-up frame assembly, a separate one of the tail shafts being provided for each of the chains of the conveyor, each end of each tail shaft extending beyond the flight of paddles; said tail shafts being mounted noncoaxial to each other to allow individual adjustment of each shaft;
   (c) offset chain engaging means mounted upon each tail shaft, each capable of carrying one chain; and,
   (d) adjustment means mounted on said take-up frame and connected to at least one end of each of said tail shafts for individually moving said tail shafts to separately tension and adjust each of said chains.

2. A tail assembly according to claim 1, wherein said chain engaging means is a sprocket.

3. A tail assembly for a multiple chain drag conveyor, according to claim 1,
   wherein said adjustment means include an eye bolt, one end of which is in engaging contact with one end of said tail shaft and the threaded end of which passes through an adjustment mount and an adjustment nut threaded upon the threaded end of said eye bolt to move said eye bolt and move said tail shaft in a direction substantially parallel to the direction of movement of said chain.

4. A tail assembly, according to claim 1, wherein each paddle is mounted perpendicular to the direction of motion of said chain.

5. A tail assembly for a multiple chain drag conveyor, according to claim 1,
   wherein said tail shafts are of substantially the same length.

6. A tail assembly, according to claim 5 wherein said tail shafts are substantially interchangeable with one another.

* * * * *